United States Patent Office 2,734,846
Patented Feb. 14, 1956

2,734,846

AQUEOUS SUSPENSION OF PROCAINE PENICILLIN AND QUATERNARY AMMONIUM SALT OF ANTIHISTAMINE

Ernst Auhagen, Ulrich Hörlein, and Klaus Bauer, Wuppertal-Elberfeld, Germany, assignors to Schenley Industries, Inc., New York, N. Y., a corporation of Delaware No Drawing. Application May 13, 1952,
Serial No. 287,597

Claims priority, application Germany May 15, 1951

6 Claims. (Cl. 167—65)

This invention relates generally to penicillin-containing compositions and, more particularly, it is concerned with certain novel, free-flowing aqueous suspensions of a water-insoluble penicillin salt, present in the suspensions in an unusually large proportion.

It is known that water-insoluble salts of penicillin can be suspended in aqueous media in minor concentrations sufficient, however, for certain therapeutic purposes. For instance, a composition comprising about ten per cent by weight of finely ground procaine penicillin suspended in an aqueous medium can be prepared readily and has sufficient fluidity to permit it to be administered by injection. Heretofore, attempts to produce suspensions, in aqueous media, containing higher concentrations of the insoluble penicillin salt have resulted in suspensions that are insufficiently fluid and too pasty for administration by injection.

It has been proposed to prepare procaine penicillin suspensions having higher concentrations of the antibiotic agent through use of an alkali salt of penicillin in the procaine penicillin suspension and such suspensions have sufficient fluidity for injection purposes, even when the procaine salt is present to the extent of about fifty per cent by weight of the mixture. However, suspensions of this type lose their activity, at least partially, when stored, due to decomposition of the alkali penicillin salt in the solution, and it has been necessary, therefore, when using suspensions of this type, to prepare the suspension freshly in each instance, immediately before it is to be administered.

An object of this invention is to provide stable aqueous suspensions of water-insoluble penicillin salts that contain a major proportion of one or more of these salts, which are stable upon storage and which have fluidity sufficient to suit them to administration by injection.

In accordance with this invention, stable aqueous suspensions containing a high concentration of finely divided water-insoluble penicillin salts are provided by dissolving in the aqueous medium an organic quaternary ammonium salt of an alkylenediamine base as hereinafter specified.

The compositions of this invention are suspensions of a substantially water-insoluble salt of penicillin, preferably the procaine salt of penicillin, in an aqueous solution of an organic quaternary ammonium salt of a histamine-antagonizing alkylenediamine base of the general formula:

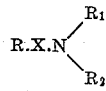

wherein R is a group, linked to the remainder of the molecule through a nitrogen atom, comprised of at least two cyclic groups, which may be homocyclic or heterocyclic, or their equivalent in a polycyclic system, having a minimum aggregate molecular weight of 150; X is an alkylene group having 2 or 3 carbon atoms in the chain linking R to the nitrogen atom; and $R_1$ and $R_2$ are alkyl groups or together constitute, with the nitrogen atom to which they are linked, a polymethyleneimino group.

Among the organic quaternary ammonium salts of histamine-antagonizing alkylenediamine bases that may be utilized in the compositions of this invention are those of the following bases:

(1) Compounds of the formula:

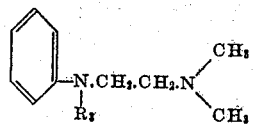

wherein $R_3$ is

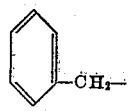

(Antergan base: N:N-dimethyl-N'-phenyl-N'-benzyl-ethylenediamine)

or

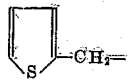

(Diatrin base: N: N-dimethyl-N'-phenyl-N'-(2-thenyl)-ethylenediamine)

(2) Compounds of the formula:

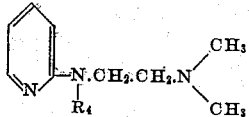

wherein $R_4$ is:

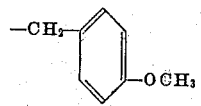

(Neoantergan base: N:N-dimethyl-N'-(4-methoxybenzyl)-N'-(2-pyridyl)-ethylenediamine)

or

(Bromothen base: N:N-dimethyl-N'-(2-pyridyl)-N'-(5-bromothenyl-2)-ethylenediamine or

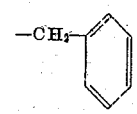

(Pyribenzamine base: N:N-dimethyl-N'-(2-pyridyl)-N'-benzyl-ethylenediamine)

or

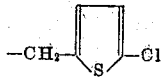

(Tagathen base: N:N-dimethyl-N'-(2-pyridyl)-N'-(5-chlorothenyl-3)-ethylenediamine)

or

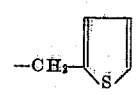

(Histadyl base: N:N-dimethyl-N'-(thenyl-2)-N'-(2-pyridyl)-ethylenediamine)

or

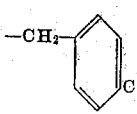

(Synopen base: N:N-dimethyl-N'-(4-chloro-benzyl)-N'-(2-pyridyl)-ethylenediamine)

or

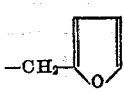

N:N-dimethyl-N'-(2-furylmethyl)-N'-(2-pyridyl)-ethylene-
diamine or

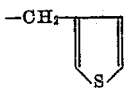

(Thenfadil base: N:N-dimethyl-N'-(thenyl-3)-N'-(2-pyridyl)-
ethylenediamine)

(3) Compounds of the formula:

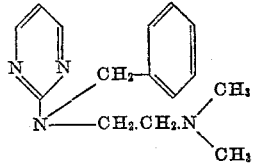

(Hetramine base: N:N-dimethyl-N'-benzyl-N'-(2-pyrimidyl)-
ethylenediamine)

or

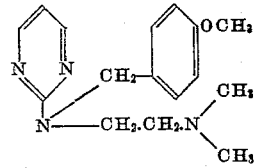

(Neohetramine base: N:N-dimethyl-N'-(4-methoxy-benzyl)-
N'-(2-pyrimidyl)-ethylenediamine)

or

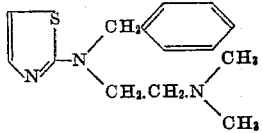

(N:N-dimethyl-N'-(thiazolyl-2)-N'-benzyl-ethylenediamine)

or

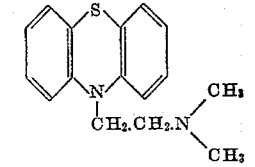

(Compound RP 3015 base: 10-(β-dimethylaminoethyl)-
phenothiazine)

or

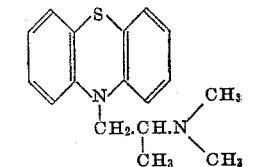

(Phenergan base: 10-(β-dimethylamino-propyl-1')-
phenothiazine)

or

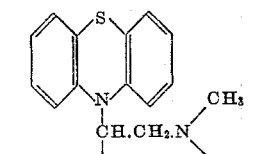

(Compound RP 3389 base: 10-(β-dimethylamino-propyl-2')-
phenothiazine or

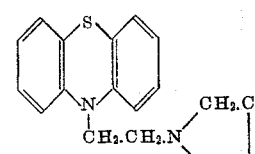

(Pyrrolazote base: 10-[β-(1-pyrrolidyl)ethyl]-phenothiazine)
or

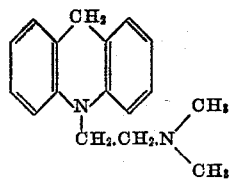

(10-(β-dimethylaminoethyl)-dihydroacridine)

The base-quaternary ammonium salts utilized in the compositions of this invention are readily obtainable by reacting the base with a suitable organic ester of an inorganic mineral acid, for instance, an alkyl or aryl halide or an alkyl sulfate, such as benzyl chloride or dimethyl sulfate. The term organic quaternary ammonium salt, as herein used in this specification and in the claims, is employed with this limited significance.

The penicillin salt suspensions according to this invention may be prepared by grinding together the water-insoluble penicillin salt and the alkylenediamine base organic quaternary ammonium salt, then adding the mixture to water in such proportions as to produce a suspension of the concentration desired or needed. Alternatively, the water-insoluble penicillin salt may be ground, then suspended in a previously prepared aqueous solution of the alkylenediamine base organic quaternary ammonium salt or the alkylenediamine base organic quaternary ammonium salt, in dry state, may be added to an aqueous slurry of the ground penicillin salt. In each instance a stable suspension is obtained, having satisfactory fluid characteristics permitting it to be used for parenteral administration by means of a hypodermic springe.

While the proportions of the components of the suspension are not critical, the alkylenediamine base organic quaternary ammonium salt should be present in the aqueous mixture in a concentration of one to about seven per cent by weight, depending upon the particle size of the water-insoluble penicillin salt being incorporated in the suspension.

A novel property of the penicillin salt suspensions according to this invention is that they do not foam when shaken, thus facilitating charging of the injection syringe without observing special precautions to avoid drawing in air bubbles that it would be difficult subsequently to discharge without loss of the medicament.

To facilitate a better understanding of the subject matter of this invention, three specific examples herewith follow. It is clearly to be understood that these examples are provided by way of illustration merely and are not to be construed as limitations upon the scope of this invention. The specific organic quaternary ammonium salts of histamine-antagonizing agents referred to in these examples may, of course, be replaced by analogous salts of any of the other histamine-antagonizing bases above mentioned and the products obtained under these circumstances are comparable to those that will now be described.

*Example 1*

About 1 part by weight of the procaine salt of penicillin is mixed with about 2 parts by weight of a one per cent aqueous solution of 10-(2'-trimethylamino-n-propyl)-phenothiazine methosulfate. A fluid suspension, suitable for parenteral administration by injection, is obtained. Although this suspension is unusually stable when stored under ordinary conditions, if desired, viscosity-modifying colloids, such as sodium carboxymethyl cellulose or the like, and buffer substances, conventionally included in procaine penicillin suspensions, may be added. The quaternary salt here utilized may be obtained by reacting equimolecular proportions of 10-(2'-dimethylamino-n-propyl)-phenothiazine and dimethyl sulfate in an ethereal medium. Its melting point is about 119° to 120° C.

*Example 2*

Approximately 1 part by weight of the procaine salt of penicillin is suspended in about 2 parts by weight of a one per-cent aqueous solution of N:N:N-trimethyl-N'-(4-methoxy-benzyl) - N' - (2-pyridyl) - ethylenediamine methosulfate. A stable fluid suspension, suitable for administration by injection, is thus obtained. The quaternary salt here utilized has a melting point of 131° C. and may be obtained by reacting equimolecular proportions of N:N-dimethyl-N'-(4-methoxybenzyl)-N'-(2-pyridyl)-ethylenediamine and dimethyl sulfate in an ethereal medium.

*Example 3*

About 1 part by weight of the procaine salt of penicillin is stirred with 2 parts by weight of water. The resulting paste is mixed with 0.025 part by weight of 10-[(2' - (N:N - dimethyl - benzylamino)-n-propyl)] - phenothiazine chloride, which has a melting point of 145° to 146° C. and which may be be prepared by reacting substantially equimolecular proportions of 10-(2'-dimethylamino-n-propyl)-phenothiazine and benzyl chloride in an acetone reaction medium. The product is a freely-flowing suspension suitable for administration by injection.

Although the histamine-antagonizing agent organic quaternary ammonium salts in the novel penicillin salt suspensions according to this invention serve to make the suspensions of a fluidity suiting them for administration by injection, a secondary property due to the presence of this agent is that it reduces the sensitivity of the pateint in instances where pencillin sensitivity may be present. This is a factor of substantial importance inasmuch as penicillin sensitivity, or at least a reaction of penicillin, in varying degrees, may be observed in as much as 10% of an average group of human patients.

Having thus described the subject matter of this invention, what it is desired to secure by Letters Patent is:

1. An aqueous suspension of the procaine salt of penicillin characterized by improved fluidity, wherein the proportion of the salt present, based on total weight, materially exceeds about ten per cent, that comprises additionally from about one to seven per cent by weight of an organic quaternary ammonium salt of a histamine-antagonistic alkylenediamine base, said base being represented by the formula:

R.X.Z wherein R is a group, comprising and linked to the remainder of the molecule through a nitrogen atom, comprised of at least two cyclic groups, havig a minimum aggregate molecular weight of 150; X is an alkylene group having at least two and at most three carbon atoms in the chain linking R with the remainder of the molecule; and Z is a group comprising a nitrogen atom, through which it is linked to the remainder of the molecule, chosen from the group consisting of dimethylamino and pyrrolidyl.

2. An aqueous suspension comprised of finely divided particles of the procaine salt of penicillin in which the proportion of salt materially exceeds about ten per cent by weight of the total weight of the suspension, and characterized by improved fluidity, that comprises additionally from about one to seven per cent by weight of an organic quaternary ammonium salt of a histamine-antagonistic alkylenediamine base, said base being represented by the formula:

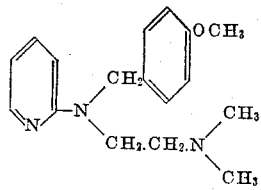

3. An aqueous suspension comprised of finely divided particles of the procaine salt of penicillin in which the proportion of salt materially exceeds about ten per cent by weight of the total weight of the suspension, and characterized by improved fluidity; that comprises additionally from about one to seven per cent by weight of an organic quaternary ammonium salt of a histamine-antagonistic alkylenediamine base, said base being represented by the formula:

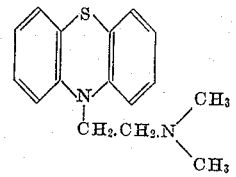

4. An aqueous suspension comprised of finely divided particles of the procaine salt of penicillin in which the proportion of salt materially exceeds about ten per cent by weight of the total weight of the suspension, and characterized by improved fluidity, that comprises additionally from about one to seven per cent by weight of an organic quaternary ammonium salt of a histamine-antagonistic alkylenediamine base, said base being represented by the formula:

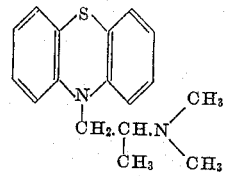

5. An aqueous suspension as defined in claim 4 wherein the organic quaternary ammonium salt is the base-dimethyl sulfate.

6. An aqueous suspension comprised of finely divided particles of the procaine salt of penicillin in which the proportion of salt materially exceeds about ten per cent by weight of the total weight of the suspension, and characterized by improved fluidity, that comprises additionally from about one to seven per cent by weight of an organic quaternary ammonium salt of a histamine-antagonistic alkylenediamine base, said base being represented by the formula:

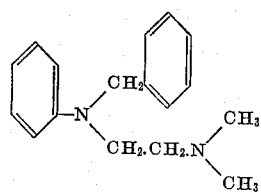

References Cited in the file of this patent

UNITED STATES PATENTS

| | | |
|---|---|---|
| 2,470,296 | Fields | May 17, 1949 |
| 2,533,066 | Taplin | Dec. 5, 1950 |
| 2,567,679 | Rhodehamel | Sept. 11, 1951 |
| 2,569,666 | Granatek | Oct. 2, 1951 |
| 2,585,239 | Granatek | Feb. 12, 1952 |

FOREIGN PATENTS

| | | |
|---|---|---|
| 658,467 | Great Britain | Oct. 10, 1951 |

OTHER REFERENCES

Simon: "Hypoallergenic Penicillin in Oil," Archives of Dermatology and Syph., August 1950, pp. 314–318.

Simon: "Hypoallergic Penicillin," Anns. Surg., March–April, 1950, pp. 194–201.

Idson: "Antihistamine Drugs," Chemical Reviews, December 1950, vol. 47, No. 3, pp. 307–527, especially at pp. 351 and 496 (quaternary ammonium salts of alkylenediamine anti-histamine bases).